C. A. STERLING.

Assignor to G. TURNER.

Fluting-Machine.

No. 8,403. Reissued Sept. 10, 1878.

WITNESSES.

Jas. E. Hutchinson.

Henry C. Hazard.

INVENTOR.

Chas. A. Sterling, by

Pindle & Pindle his Attys

N. PETERS, PHOTO-LITHOGRAPHER, WASHINGTON, D. C.

UNITED STATES PATENT OFFICE.

CHARLES A. STERLING, OF NEW YORK, N. Y., ASSIGNOR, BY MESNE ASSIGNMENT, TO GEORGE TURNER.

IMPROVEMENT IN FLUTING-MACHINES.

Specification forming part of Letters Patent No. 57,403, dated August 21, 1866; Reissue No. 8,103, dated September 10, 1878; application filed August 27, 1878.

*To all whom it may concern:*

Be it known that I, CHARLES A. STERLING, of New York city, county of New York, and State of New York, have invented certain new and useful Improvements in Fluting-Machines, for which Letters Patent No. 57,403 were issued to me upon the 21st day of August, 1866, which Letters Patent having been found defective, in that the specification and claims do not cover and embrace all of the original invention, as set forth in the application filed in the Patent Office on the 30th day of June, 1866, now, therefore, being desirous of reissuing said Letters Patent herewith surrendered, I have prepared, and do hereby declare that the following is a full, clear, and exact description of the said invention, reference being had to the accompanying drawing, making a part of this specification, in which—

Figure 1:
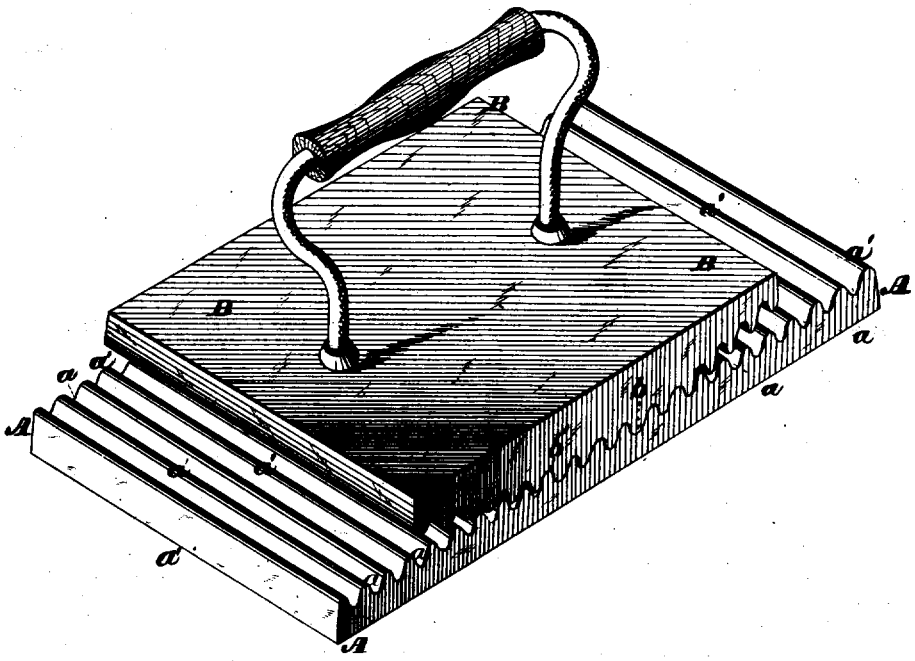
Figure 2:
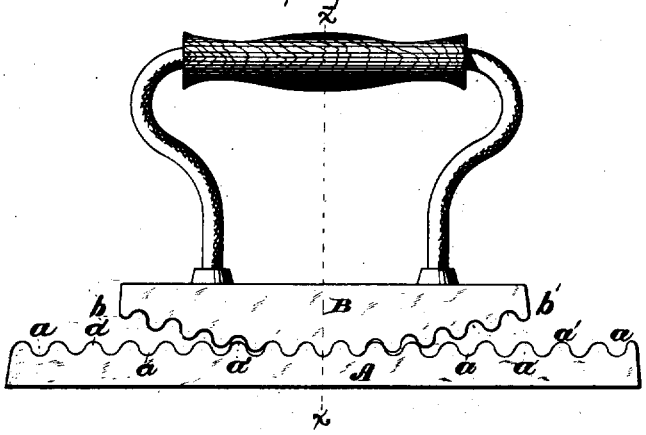
Figure 3:
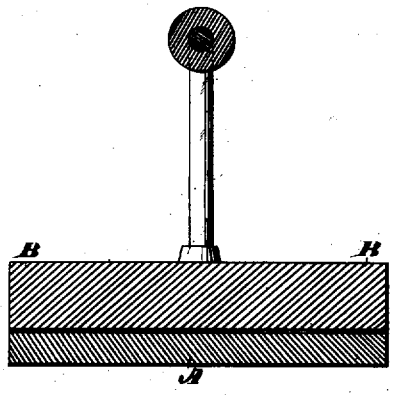

Figure 1 is a perspective view of my device as arranged for use. Fig. 2 is a side elevation of the same, and Fig. 3 is a vertical section upon line *x x* of Fig. 2.

Letters of like name and kind refer to like parts in each of the figures.

The design of my invention is to enable textile fabrics or other flexible material to be corrugated or fluted with ease and dispatch; and to this end it consists in a fluting device composed of a corrugated bed and a correspondingly-corrugated presser block or plate, substantially as and for the purpose hereinafter specified.

In the annexed drawing, A represents the bed of my device, constructed of or from metal, and provided upon its upper surface with transverse grooves *a*, between which are correspondingly-shaped ribs *a'*, said grooves and ribs having any desired form.

A presser, B, constructed of metal, is provided upon its bearing-face with ribs *b* and grooves *b'*, that correspond to and may be caused to mesh with the grooves *a* and ribs *a'* of the bed A, so that when said parts are heated, and a fabric is placed over said bed, and said presser is placed upon said fabric and pressed downward, the latter shall be caused to conform to and fit within the said corrugations, and shall have and retain the shape of the same.

The bearing-face of the presser B is formed upon a curved line, and in use it is caused to roll over the base A, so that but one of its corrugations is in full engagement with said base at any one time, the result of such construction being the successive formation of each corrugation or flute upon the fabric, while, if said presser and bed engaged along their entire bearing-surfaces, the fabric would be drawn out of shape and torn.

Having thus fully set forth the nature and merits of my invention, what I claim as new is—

A fluting device composed of a corrugated bed and a correspondingly-corrugated presser block or plate.

In testimony that I claim the foregoing I have hereunto set my hand this 5th day of August, A. D. 1878.

CHAS. A. STERLING.

Witnesses:
J. V. BAGLEY,
A. N. NAKER.